(12) United States Patent
Strasman

(10) Patent No.: US 9,137,278 B2
(45) Date of Patent: Sep. 15, 2015

(54) MANAGING STREAMING BANDWIDTH FOR MULTIPLE CLIENTS

(75) Inventor: Nery Strasman, Ramat Gan (IL)

(73) Assignee: Vasona Networks Inc., Santa Clara, CA (US)

( * ) Notice: Subject to any disclaimer, the term of this patent is extended or adjusted under 35 U.S.C. 154(b) by 274 days.

(21) Appl. No.: 13/109,019

(22) Filed: May 17, 2011

(65) Prior Publication Data

US 2011/0314130 A1  Dec. 22, 2011

Related U.S. Application Data

(63) Continuation-in-part of application No. 13/129,399, filed as application No. PCT/IB2011/051501 on Apr. 7, 2011.

(60) Provisional application No. 61/345,210, filed on May 17, 2010, provisional application No. 61/321,891, filed on Apr. 8, 2010.

(51) Int. Cl.
| | |
|---|---|
| *H04L 29/06* | (2006.01) |
| *H04N 21/2343* | (2011.01) |
| *H04N 21/2385* | (2011.01) |
| *H04N 21/24* | (2011.01) |
| *H04N 21/262* | (2011.01) |
| *H04N 21/2662* | (2011.01) |
| *H04N 21/6377* | (2011.01) |
| *H04N 21/845* | (2011.01) |

(52) U.S. Cl.
CPC ............ *H04L 65/4069* (2013.01); *H04L 29/06* (2013.01); *H04L 65/80* (2013.01); *H04N 21/2385* (2013.01); *H04N 21/23439* (2013.01); *H04N 21/2402* (2013.01); *H04N 21/2662* (2013.01); *H04N 21/26258* (2013.01); *H04N 21/6377* (2013.01); *H04N 21/8456* (2013.01)

(58) Field of Classification Search
CPC ............ H04L 65/4069; H04L 65/4076; H04L 65/4092; H04L 65/60; H04L 65/608; H04L 65/80; H04L 29/06; H04N 21/8456; H04N 21/23439; H04N 21/2662; H04N 21/6377; H04N 21/26258; H04N 21/2402; H04N 21/2385
USPC .................................. 709/223, 231, 232, 246
See application file for complete search history.

(56) References Cited

U.S. PATENT DOCUMENTS

| 6,385,673 | B1 | 5/2002 | DeMoney |
| 6,697,378 | B1 | 2/2004 | Patel |
| 8,205,004 | B1 * | 6/2012 | Kaufman et al. ............. 709/231 |
| 2003/0067872 | A1 * | 4/2003 | Harrell et al. ................. 370/229 |
| 2004/0203825 | A1 | 10/2004 | Cohen et al. |
| 2005/0114538 | A1 | 5/2005 | Rose |
| 2005/0148314 | A1 | 7/2005 | Irizarry et al. |

(Continued)

*Primary Examiner* — Paul H Masur
*Assistant Examiner* — Kabir Jahangir
(74) *Attorney, Agent, or Firm* — Reches Patents

(57) ABSTRACT

A method, system and a computer program product. The method may include: selecting, for each requested media file, a selected version of the media file based on (a) bit rates of the different versions of the requested media file, and (b) a bit rate allocated for a transmission of the requested media file to the client; generating a modified manifest file for each requested media file by removing retrieval information associated with all non-selected versions of requested media files; wherein each modified manifest file comprises retrieval information required only for a retrieval of a selected version of a requested media file associated with the modified manifest file; and sending to clients the modified manifest files.

32 Claims, 8 Drawing Sheets

(56) References Cited

U.S. PATENT DOCUMENTS

| | | |
|---|---|---|
| 2005/0204046 A1 | 9/2005 | Watanabe |
| 2007/0220021 A1* | 9/2007 | Kato et al. .................... 707/100 |
| 2008/0212480 A1 | 9/2008 | Shimonishi |
| 2009/0043867 A1* | 2/2009 | Sharp et al. ................... 709/218 |
| 2009/0268747 A1* | 10/2009 | Kurata et al. ................. 370/412 |
| 2009/0288076 A1* | 11/2009 | Johnson et al. ............... 717/168 |
| 2009/0327079 A1 | 12/2009 | Parker et al. |
| 2010/0034089 A1 | 2/2010 | Kovvali et al. |
| 2010/0074275 A1 | 3/2010 | Sahai |
| 2010/0131671 A1* | 5/2010 | Kohli et al. ................... 709/233 |
| 2010/0151899 A1 | 6/2010 | Lekutai |
| 2010/0195602 A1 | 8/2010 | Kovvali et al. |
| 2010/0238083 A1* | 9/2010 | Malasani ....................... 343/765 |
| 2010/0306653 A1* | 12/2010 | Wang et al. ................... 715/716 |
| 2011/0032898 A1 | 2/2011 | Kazmi et al. |
| 2011/0082924 A1* | 4/2011 | Gopalakrishnan ............ 709/223 |
| 2011/0145726 A1 | 6/2011 | Wei et al. |
| 2011/0197239 A1 | 8/2011 | Schlack |
| 2012/0039191 A1 | 2/2012 | Foster et al. |
| 2012/0052866 A1 | 3/2012 | Froehlich et al. |
| 2012/0087260 A1 | 4/2012 | Devarapalli et al. |
| 2013/0016620 A1 | 1/2013 | Den Hartog et al. |
| 2013/0163428 A1 | 6/2013 | Lee et al. |

* cited by examiner

MANAGING STREAMING BANDWIDTH FOR MULTIPLE CLIENTS

RELATED APPLICATIONS

This application is a continuation in part of U.S. patent application Ser. No. 13/129,399 filing date May 16, 2011, which is a national phase application of PCT patent application No. PCT/IB2011/051501 filing date Apr. 7, 2011, which in turn claims priority from U.S. provisional patent Ser. No. 61/321,891, filing date Apr. 8, 2010, all being incorporated herein by reference. This application also claims priority from U.S. provisional patent Ser. No. 61/345,210 filing date May 17, 2010 which is incorporated herein by reference.

BACKGROUND OF THE INVENTION

Video streaming is an important application over the Internet. The number of available streams, servers and users is rapidly growing and is the leading consumer of bandwidth.

"Classical" Streaming

Streaming in its original form was performed by transmitting a stream from the server to a client with little feedback. Feedback was only provided if the client did not receive data within a given time. The feedback could be done by use or lack of Acknowledgement (Ack) messages if the stream was sent over the TCP protocol or by resending requests for the stream by the client. In many cases the protocol used was RTSP.

Adaptive Bit Rate with "Classical" Streaming

Since the server and the client do not have clear visibility of the medium between them, it is practically impossible for the server to know if a stream with one specific bit-rate could reach the client or whether bandwidth congestion on the way would block the client from receiving it. Therefore, servers adopted different adaptive bit rate methods. In all cases, the servers maintain a few versions of the stream, each one encoded in a different bit-rate. In the general case, if a segment of a stream with a specific bit rate did not reach the client, the server would try to retransmit the stream with a lower bit rate.

Lower bit rates can be achieved by lowering spatial resolution, number of frames per second or simply applying stronger compression to the stream. In cases where the clients received all the transmitted segments, the server could revert to higher bit rate versions of the stream and transmit those. In these cases, the device which decided which bit rates to use was the server.

HTTP Streaming

For different reasons including firewall restrictions and compatibility between different servers and clients, the market has generally reverted (or is in the process of reverting) to HTTP streaming. When performing HTTP streaming the client requests a file download over HTTP. In this case, the client may request only parts of a file or all of it. If the client desires, it may stop the downloading of the file and ask the server to download a different file. To sum this up, in the simplest sense, HTTP streaming involves a file download from the server to the client. This type of streaming is often known as Progressive Download (PD).

Adaptive Bit Rate (ABR) with Http Streaming

Adaptive bit rate with HTTP streaming is a relatively new technology. When it is used, the server first saves a few different versions of the video clip. The difference is usually a bitrate difference but there might also be resolution or other differences between the versions. The different versions are chopped into small segments usually known as fragments or chunks (these words are used interchangeably in this application) which have a playback duration of a few seconds. The server sends the client a manifest file. The manifest file informs the client which versions are available, the duration of the fragments and where the client can find the different fragments. The client then asks the server to transmit specific fragments of the stream.

ABR HTTP streaming can also be used with live streaming. In this case, the manifest file is constantly updated and sent to the client. In some ABR cases, each bit rate chunk is stored as a single file. In other cases, each file holds the entire stream with one specific bit rate and different chunks are simply different segments of the file. Other implementations may include only one file which is segmented by bit rates and chunks.

As in classical streaming, the client and server do not have any information regarding the medium between them. Therefore, a mechanism is needed here also to determine the stream's bit rate. In this case it is the client which makes the decision. Algorithms implemented in the client decide which bit rate chunk to request from the server. The decision may be influenced by several factors such as available buffer space, processing power of the client and bandwidth considerations such as: if the previously requested chunk was not received (probably because of network congestion)—request a lower bit rate fragment next time. Occasionally the client may request a chunk with a bit rate which is higher than the last received chunk.

The Problem

Different clients often share the same resources often referred to as the Last Mile channel. For example, cellular/mobile devices may share the same cell in newer systems or the same frequency within a cell in older systems. In cable networks, clients may share the same QAM channel. The last mile channel in all networks is limited to a specific bandwidth. Often, this bandwidth may not be enough to allow all bit rates demanded by all services transmitted to the downstream devices. In order to reduce data loss some management of the bandwidth is needed. However, with streaming, management is not available. The only methods the network operator can use are to set priorities to different devices or services and to limit bandwidth for devices or services. Both solutions are not good. When setting priorities, one service or device can consume extremely large amounts of bandwidth and completely starve other clients. Limiting bit rates poses other problems such as leaving unused bandwidth on the pipe or setting the limit so low that services cannot be delivered at all or are delivered with many interruptions. The network operator can't manage the last mile channel efficiently because it is not aware of the transactions between the servers and clients. Following are two examples of these inefficiencies but there are many more. For the sake of simplicity, in the examples the assumption is that only streaming sessions occupy the last mile channel pipe.

Unused Bandwidth

Assume that all the bandwidth is utilized and each device receives chunks as requested. Now assume that one device ceases to request the service and drops off. Bandwidth which was allocated for this device is now free but other devices are not aware of this and therefore none of them request a chunk with higher bit rate. As a result the bandwidth remains free and unused until a device requests higher bit rate. This means that at least some of the devices could have received chunks at higher bit rate and therefore better quality but this didn't happen.

Bandwidth Waste

Assume that all the bandwidth is utilized and all devices receive chunks as requested. Now assume that one device attempts to receive a chunk at a higher bit rate because it doesn't know that all the bandwidth is utilized. It requests a chunk at a higher bit rate. The server attempts to transmit the requested chunk. Now there is congestion on the last mile channel and data will be discarded. The data discarded may be data that serves any one of the devices. Statistically, more than one service will be affected. This may include the device which initiated the high bit rate request. The affected devices will not receive the chunks they requested. All these devices will experience losses in the TCP layer and would therefore send resend requests. Since the data requests are performed in the HTTP layer and are made for fragments with durations of a few seconds, this situation can't be corrected by TCP or HTTP layer mechanisms for the duration of the fragments. In effect, much data will be discarded.

SUMMARY OF THE INVENTION

According to various embodiments of the invention a method for controlling streaming media flows is provided, the method may include allocating or receiving allocated bit rates to a media file that comprises a plurality of chunks and is expected to be streamed over a last mile channel that is bandwidth limited; receiving, from a media streamer, a manifest file for multiple versions of the media file; wherein different version of the media file differ from each other by bit rate; wherein a manifest file associated the media file comprises retrieval information required for retrieving different versions of the media file; receiving a manifest file request from a client that is hosted on a user device, wherein the manifest file request is received from a client and comprises a request to receive retrieval information required for a retrieval of a manifest file associated with a requested media file that is requested by the client; selecting a selected version of the media file based on (a) bit rates of the different versions of the requested media file, and (b) a bit rate allocated for a transmission of the requested media file to the client; generating a modified manifest file for the requested media file by removing retrieval information associated with all non-selected versions of the requested media file; wherein the modified manifest file comprises retrieval information required only for a retrieval of a selected version of the requested media file; and sending to the client the modified manifest file.

The method may include allocating or receiving allocated bit rates to a plurality of media files, each media file comprises a plurality of chunks and is expected to be streamed over a last mile channel that is bandwidth limited; receiving, from a media streamer, a manifest file for multiple versions of each of the plurality of media files; wherein different version of a same media file differ from each other by bit rate; wherein a manifest file associated with a media file comprises retrieval information required for retrieving different versions of the media file; receiving a plurality of manifest file requests from a plurality of clients that are hosted on user devices, wherein each manifest file request received from a client comprises a request to receive retrieval information required for a retrieval of a manifest file associated with a requested media file that is requested by the client; selecting, for each requested media file, a selected version of the media file based on (a) bit rates of the different versions of the requested media file, and (b) a bit rate allocated for a transmission of the requested media file to the client; generating a modified manifest file for each requested media file by removing retrieval information associated with all non-selected versions of requested media files; wherein each modified manifest file comprises retrieval information required only for a retrieval of a selected version of a requested media file associated with the modified manifest file; and sending to the clients the modified manifest files.

The method may include selecting a selected version of the media file that has a bit rate that best matches the bit rate allocated to the transmission of the media file to the client.

The allocating of bit rates to the plurality of media files may be responsive to bit rates of different versions of the plurality of media files.

The method may include receiving a plurality of chunk requests from a plurality of clients, wherein each chunk request requests at least one chunk that belongs to a selected version of a requested media file; and sending the plurality of chunk requests to the media streamer.

The method may include sending to the media streamer the plurality of chunk requests; receiving from the media streamer chunks requested by the plurality of chunk requests; and sending to the plurality of clients the chunks.

The generating of a modified manifest file for each requested media file may include removing retrieval information associated with a selected version of a part of a requested media file associated with the modified manifest file.

The method may include generating a new modified manifest file for each requested media file, wherein the new modified manifest file comprises retrieval information previously removed from the modified manifest file and is associated with the selected version of the part of the requested media file associated with the modified manifest file.

The method may include generating at least one modified manifest file even at an absence of a manifest file request from a client to retrieve the at least one modified manifest file.

The media streamer may be unaware of a stage of the last mile channel.

The method may include allocating the allocated bit rate to each of the media files by a system that is coupled to last mile channel.

According to an embodiment of the invention there is provided a system that may include (a) an input interface arranged to receive: allocated bit rates to a plurality of media files, each media file comprises a plurality of chunks and is expected to be streamed over a last mile channel that is bandwidth limited; a manifest file for multiple versions of each of the plurality of media files; wherein different version of a same media file differ from each other by bit rate; wherein a manifest file associated with a media file comprises retrieval information required for retrieving different versions of the media file; a plurality of manifest file requests from a plurality of clients that are hosted on user devices, wherein each manifest file request received from a client comprises a request to receive retrieval information required; (b) a processing module that may be arranged to: select, for each requested media file, a selected version of the media file based on (a) bit rates of the different versions of the requested media file, and (b) a bit rate allocated for a transmission of the requested media file to the client; generate a modified manifest file for each requested media file by removing retrieval information associated with all non-selected versions of requested media files; wherein each modified manifest file comprises retrieval information required only for a retrieval of a selected version of a requested media file associated with the modified manifest file; and (c) an output interface arranged to send to the clients the modified manifest files.

The input interface may be arranged to receive (i) allocated bit rates to a plurality of media files, each media file comprises a plurality of chunks and is expected to be streamed over a last mile channel that is bandwidth limited; and (ii) a manifest file for multiple versions of each of the plurality of media files; wherein different version of a same media file differ from each other by bit rate; wherein a manifest file associated with a media file comprises retrieval information required for retrieving different versions of the media file; (iii) a plurality of manifest file requests from a plurality of clients that are hosted on user devices, wherein each manifest file request received from a client comprises a request to receive retrieval information required for a retrieval of a manifest file associated with a requested media file that is requested by the client; wherein the processing module may be arranged to (i) select, for each requested media file, a selected version of the media file based on (a) bit rates of the different versions of the requested media file, and (b) a bit rate allocated for a transmission of the requested media file to the client; and (ii) generate a modified manifest file for each requested media file by removing retrieval information associated with all non-selected versions of requested media files; wherein each modified manifest file comprises retrieval information required only for a retrieval of a selected version of a requested media file associated with the modified manifest file; and wherein the output interface may be arranged to send to the clients the modified manifest files.

The processing module may be arranged to select a selected version of the media file that has a bit rate that best matches the bit rate allocated to the transmission of the media file to the client.

The processing module may be arranged to allocate bit rates to the plurality of media files is responsive to bit rates of different versions of the plurality of media files.

The input interface may be arranged to receive a plurality of chunk requests from a plurality of clients, wherein each chunk request requests at least one chunk that belongs to a selected version of a requested media file; and wherein the output interface may be arranged to send the plurality of chunk requests to the media streamer.

The output interface may be arranged to send to the media streamer the plurality of chunk requests; wherein the input interface may be arranged to receive from the media streamer chunks requested by the plurality of chunk requests; and wherein the output interface may be arranged to send to the plurality of clients the chunks.

The processing module may be arranged to generate a modified manifest file for each requested media file by removing retrieval information associated with a selected version of a part of a requested media file associated with the modified manifest file.

The processing module may be arranged to generate a new modified manifest file for each requested media file, wherein the new modified manifest file comprises retrieval information previously removed from the modified manifest file and is associated with the selected version of the part of the requested media file associated with the modified manifest file.

The processing module may be arranged to generate at least one modified manifest file even at an absence of a manifest file request from a client to retrieve the at least one modified manifest file.

The media streamer may be unaware of a stage of the last mile channel.

The processing module may be arranged to allocate the allocated bit rate to each of the media files by a system that is coupled to last mile channel.

According to an embodiment of the invention there is provided a computer program product that comprises a non-transitory computer readable medium that may store instructions for: allocating or receiving allocated bit rates to a plurality of media files, each media file comprises a plurality of chunks and is expected to be streamed over a last mile channel that is bandwidth limited; receiving, from a media streamer, a manifest file for multiple versions of each of the plurality of media files; wherein different version of a same media file differ from each other by bit rate; wherein a manifest file associated with a media file comprises retrieval information required for retrieving different versions of the media file; receiving a plurality of manifest file requests from a plurality of clients that are hosted on user devices, wherein each manifest file request received from a client comprises a request to receive retrieval information required for a retrieval of a manifest file associated with a requested media file that is requested by the client; selecting, for each requested media file, a selected version of the media file based on (a) bit rates of the different versions of the requested media file, and (b) a bit rate allocated for a transmission of the requested media file to the client; generating a modified manifest file for each requested media file by removing retrieval information associated with all non-selected versions of requested media files; wherein each modified manifest file comprises retrieval information required only for a retrieval of a selected version of a requested media file associated with the modified manifest file; and sending to the clients the modified manifest files.

The non-transitory computer readable medium may store instructions for allocating or receiving allocated bit rates to a plurality of media files, each media file comprises a plurality of chunks and is expected to be streamed over a last mile channel that is bandwidth limited; receiving, from a media streamer, a manifest file for multiple versions of each of the plurality of media files; wherein different version of a same media file differ from each other by bit rate; wherein a manifest file associated with a media file comprises retrieval information required for retrieving different versions of the media file; receiving a plurality of manifest file requests from a plurality of clients that are hosted on user devices, wherein each manifest file request received from a client comprises a request to receive retrieval information required for a retrieval of a manifest file associated with a requested media file that is requested by the client; selecting, for each requested media file, a selected version of the media file based on (a) bit rates of the different versions of the requested media file, and (b) a bit rate allocated for a transmission of the requested media file to the client; generating a modified manifest file for each requested media file by removing retrieval information associated with all non-selected versions of requested media files; wherein each modified manifest file comprises retrieval information required only for a retrieval of a selected version of a requested media file associated with the modified manifest file; and sending to the clients the modified manifest files.

The non-transitory computer readable medium may store instructions fo selecting a selected version of the media file that has a bit rate that best matches the bit rate allocated to the transmission of the media file to the client.

The non-transitory computer readable medium may store instructions for allocating of bit rates to the plurality of media files in response to bit rates of different versions of the plurality of media files.

The non-transitory computer readable medium may store instructions for receiving a plurality of chunk requests from a plurality of clients, wherein each chunk request requests at least one chunk that belongs to a selected version of a requested media file; and sending the plurality of chunk requests to the media streamer.

The non-transitory computer readable medium may store instructions for sending to the media streamer the plurality of chunk requests; receiving from the media streamer chunks requested by the plurality of chunk requests; and sending to the plurality of clients the chunks.

The non-transitory computer readable medium may store instructions for generating of a modified manifest file for each requested media file by removing retrieval information associated with a selected version of a part of a requested media file associated with the modified manifest file.

The non-transitory computer readable medium may store instructions for generating a new modified manifest file for each requested media file, wherein the new modified manifest file comprises retrieval information previously removed from the modified manifest file and is associated with the selected version of the part of the requested media file associated with the modified manifest file.

The non-transitory computer readable medium may store instructions for generating at least one modified manifest file even at an absence of a manifest file request from a client to retrieve the at least one modified manifest file.

The non-transitory computer readable medium may store instructions for allocating the allocated bit rate to each of the media files by a system that is coupled to last mile channel.

A method may be provided and may include, according to an embodiment of the invention: receiving a first manifest file and information about a communication network condition; wherein the manifest is associated with at least one media file and comprises first retrieval information required for retrieving the at least one media file; and generating, in response to the information about the communication network condition a second manifest file that comprises second retrieval information that differs from the first retrieval information.

The first retrieval information may expose a first group of versions of the at least one media file and the second retrieval information exposes a second group of versions of the at least one media file, wherein the first group differs from the second group.

There can be provided a computer program product that includes a non-transitory computer readable medium that stores instructions for receiving a first manifest file and information about a communication network condition; wherein the manifest is associated with at least one media file and comprises first retrieval information required for retrieving the at least one media file; and generating, in response to the information about the communication network condition a second manifest file that comprises second retrieval information that differs from the first retrieval information.

The first retrieval information may expose a first group of versions of the at least one media file and the second retrieval information exposes a second group of versions of the at least one media file, wherein the first group differs from the second group.

According to an embodiment of the invention there may be provided a system that includes an input interface for receiving a first manifest file and information about a communication network condition; wherein the manifest is associated with at least one media file and comprises first retrieval information required for retrieving the at least one media file; and a manifest file module for generating, in response to the information about the communication network condition a second manifest file that comprises second retrieval information that differs from the first retrieval information.

The first retrieval information may expose a first group of versions of the at least one media file and the second retrieval information exposes a second group of versions of the at least one media file, wherein the first group differs from the second group.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof may best be understood by reference to the following detailed description when read with the accompanying drawings in which:

Figure 1:
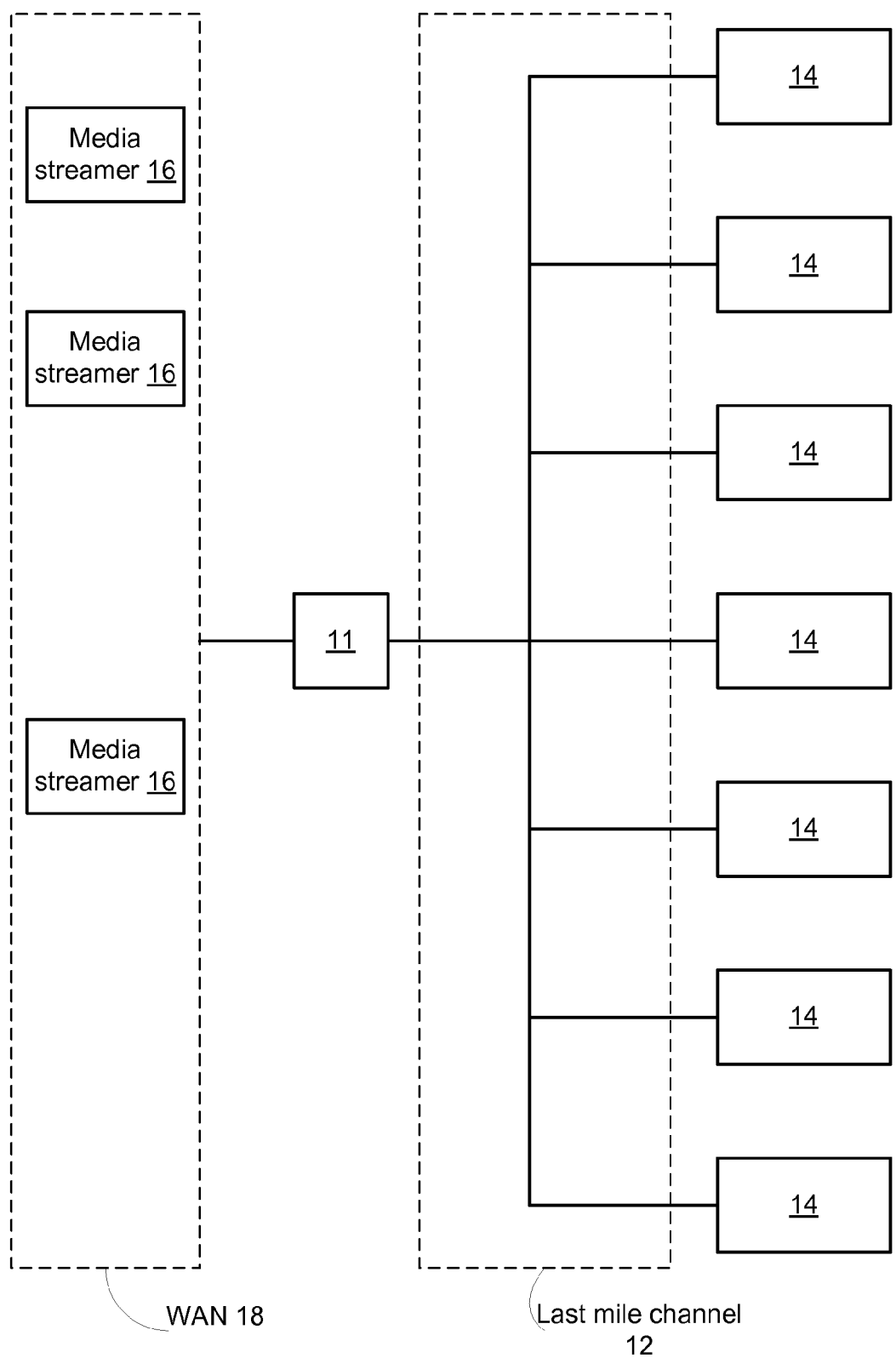
FIG. 1 illustrates a system and its environment according to an embodiment of the invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention. In all the method the same reference numbers represent the same elements (stages of a method, entities of a system).

The term "chunk request" is a request to receive a media chunk of a streaming media flow. A streaming media flow is a media flow that is configured to be streamed by a media streamer. The streaming media flow may include a media file that is being streamed towards a client. The chunk request may include a chunk identifier and a bit rate (bit rate) request that indicated the desired bit rate of the requested chunk. The requested bit rate can be defined in an explicit manner (for example—the value of the requested bit rate can be included in the chunk request) or implicitly (for example—the chunk identifier may point to a certain version of the media chunk—of a known bit rate). The chunk request can include a URL that is specific to a specific segment and a specific bit rate.

The term "media source" can mean an entity that provides media chunks to the system or to clients. The media source can receive the media chunks from another entity, can generate the media chunks himself, can generate various version of media chunks that differ from each other by their bit rate, can receive various versions of the media chunks from another entity ad the like. The media source can be a media server.

A media source that is capable of streaming one or more streaming media flows is referred to as a media streamer.

The term "last mile" may have its regular meaning For example, it may have the meaning defined by www.wikipedia.org: "The "last mile" or "last kilometer" is the last mile of delivering connectivity from a communications provider to a customer. The phrase is therefore often used by the telecommunications and cable television industries. The actual distance of this leg may be considerably more than a mile, especially in rural areas. It is typically seen as an expensive challenge because "fanning out" wires and cables is a considerable physical undertaking. Because the last mile of a network to the user is also the first mile from the user to the world in regards to sending data (such as uploading), the term "first mile" is sometimes used.

The term "manifest file" means any data structure or structures that include retrieval information required for a retrieval of one or more media file chunks, one or more media file, or one or more parts of media files.

According to an embodiment of the invention a system is provided. It is connected between the Internet or any Wide Area Network (WAN) and the last mile channel. For convenience of explanation the following description will refer to a last mile channel although it is applicable to other types of infrastructures. The last mile channel can include links, communication lines or any kind of bandwidth limited resources.

According to various embodiments of the invention the allocation of bit rates can be responsive to at least one parameter out of media stream priority, client priority, video quality, service priority, priority assigned to different types of streaming, policies responsive to the timing of streaming, to the type of transmission (wired, wireless), and the like. For example—client of higher priority may be allocated more bit rate.

According to an embodiment of the invention the bit rate allocation is executed by a system that is coupled to the last mile channel. It is noted that the bit rate allocation can be executed by a plurality of systems—in a distributed, centralized or even hierarchical manner. A hierarchical system can include a top tier system arranged to allocate bit rates over a first bandwidth limited medium, while the lowest tier system can be arranged to determine the bit rate allocation over a plurality of last mile channels that may receive content (directly or indirectly) from the first bandwidth limited medium. Yet for another example—the hierarchical system can include a top tier system arranged to allocate bit rates over the last mile channel, while the lowest tier system can be arranged to determine the bit rate allocation over channels that are fed from the last mile channel—such as customer premises gateways and the like.

FIG. 1 illustrates a system 11 that is connected between a WAN (such as the Internet), last mile channel 12 and user devices that host clients 14.

According to various embodiments of the invention user devices host clients. The clients and, additionally or alternatively, the system may participate in the bit rate control of the bandwidth limited resource. It is noted that end user devices and the media streamer may not be aware of the state of the bandwidth limited resource and thus may request or allocate bit rates in sub-optimal manner, as illustrated for example in the background section of this patent application.

The system 11 may reside before a bandwidth limiting resource, or otherwise can be able to participate in the bit rate control of the bandwidth limited resource. The system may be a router, an aggregator, a switch, a controller, or a combination thereof. The system can include hardware, software firmware or a combination thereof.

According to an embodiment of the invention a bit rate control scheme is executed by the system in a manner that is not viewed by the clients. The system allocates bit rates and according to the allocation of bit rates determines which metadata to send to the clients so that the clients will request chunks of media files that have a bit rate that matches (or is responsive) to the allocated bit rate—one version per one requested media file.

A media file can be represented by multiple versions that differ from each other by bit rate. The different versions of the media file can be generated in real time or off-line. In both cases, the system transmits to a client metadata that will expose to the client only to a selected version of the media file—the version of the media file that has a bit rate that fits to the allocation of bit rates. The client may be prevented from being exposed to non-selected versions of the media file—that have bit rates that do not comply with the selection. For example—non-selected versions that have bit rates that may be higher or lower than the allocated bit rate.

The multiple version of a media file can be grouped to multiple groups—wherein different groups of media files may include different versions. The groups may share one or two versions and may include at least one or more versions that differ between groups.

According to another embodiment of the invention the media file is prepared in advance—and may be associated with a manifest file that describes the different versions of the entire media file. Instead of transmitting to the client a modified manifest file that describes a selected version of the entire media file, the system can send to the client only a modified manifest file that refers to a selected version of a part of the entire media file. When the client wishes to receive another part of the media file it may transmit another manifest file request. If the selection of the version of the other part of the media file changes—the system can send to the client a modified manifest file that reflects the change.

According to an embodiment of the invention the system receives from a media streamer a manifest file per each media file, per each part of the media file. A media file can be segmented to multiple parts for various reasons, including traffic management, storage constrains and the like. Additionally or alternatively, the partition of the media file to parts can be used for controlling the amount of manifest file requests sent by a user. The manifest file include retrieval information (for example—URL, pointers to addresses in the URL) required for retrieving the media file to be streamed to the client. The system prevents the client from receiving information that can be used for retrieving non-selected versions of the media file while sending to the client retrieval information that allows a retrieval of the selected versions of the media files.

The client is made aware of a single version of the media file and sends (via the system or via another path) chunk requests that request the provision of media file chunks that have a bit rate that complies with the allocation of bit rate.

Thus, the system can enforce a bit rate allocation in a manner that is not visible to the client or to the media streamer.

The bit rate allocation can be modified from time to time and it may result in evaluating the selection of versions of the media files by the system. A change in a version is followed by a change in the metadata sent to the client.

According to one embodiment of the invention modified manifest files are sent to the clients only in response to a reception of manifest file requests.

According to another embodiment of the invention modified manifest files are sent to the clients even at an absence of media file requests. Thus, the system can initiate to send modified manifest files in response to events (that differ from a reception of manifest file requests), after a predetermined time period lapses from a last reception of a manifest file request, in response to a change in an allocation of bit rates, after a streaming of a predefined portion of a media file to a client, and the like.

According to an embodiment of the invention the system receives a manifest file from the media streamer and modifies it to provide a modified manifest file. The modification can include removing retrieval information relating to non selected versions of a media file. Additionally, the removal can include sending retrieval information of only a part of the media file, thus causing the client to send a new manifest file request that is related to another part of the media file. This alteration and re-transmission of manifest file requests can allow the system to alter the manifest file during the streaming of the media file.

A media file can include multiple parts, for each part of the media file the following sequence can be executed: bit rate allocation, selection of a selected version of the part of the media file, modification of the manifest file and the transmission of the modified manifest file to the client. It is noted that after these stages are executed by the system, the clients can send chunk request that may be aimed to chunks of the selected version of the part of the media file. The chunk requests can be received by the system and sent to a media streamer. The chunks (sent as a result of the chunk requests) can be sent to the system and from the system to the clients.

According to an embodiment of the invention the media file is a live media file that is generated in real time and can be sent immediately (or after a small delay) to the clients. Thus, at any given time new media files are received and they can be associated with newly generated manifest files. In this scenario manifest file requests are inherently generated by the clients per each predefined time period or per each amount of streamed media file information. Thus, a transmission of an entire media file involves multiple transmissions of manifest file requests from the client—allowing to easily introduce changes in the allocated bit rate and in the selected versions of different parts of the media file.

The system may apply bit rate allocation by applying any bit rate allocation scheme.

In any of the mentioned above embodiments the bit rate allocation between clients and additionally or alternatively, between services or flows, can be responsive to parameters such as: (i) video quality, (ii) user priority, (iii) operator priority, (iv) service (flow) priority; and (v) billing considerations.

Figure 2:
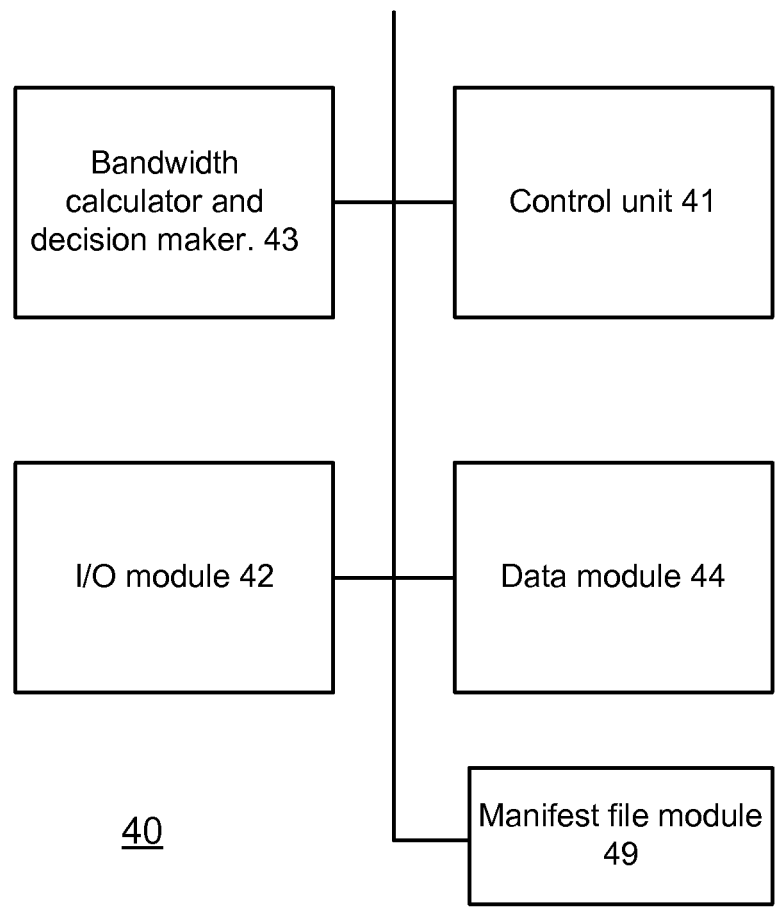
FIG. 2 illustrates a system according to an embodiment of the invention.

FIG. 2 illustrates a system 40 according to an embodiment of the invention. The system 40 includes:

a. An Input Output (I/O) module 42 that includes an input interface and an output interface. The I/O module 42 may be arranged to handle incoming and outgoing traffic including upstream chunk requests and downstream chunks.

b. A bandwidth calculator and decision maker. The module 43 may be arranged to estimate the available bandwidth on the last mile channel and to make decisions regarding the amount of bit rate that can be allocated for each client. This module can be a processing module or can be hosted by a processing module. The processing module can include hardware components.

c. A data module 44 that includes a parser that may create and parse relevant messages vis-à-vis the clients and the media streamers;

d. A manifest file module 49 arranged to receive the bit rate allocation, manifest files and to generate modified manifest files.

e. A control unit 41 that allocates resources among the modules of the system 40 and controls timing and similar issues.

It should be noted that other implementations are also possible including ones that include a memory units and many other possibilities. Decision making can be based on many different approaches including some mentioned below.

The system 40 may reside on the network side of the last mile channel 12, and has a visibility to all the requirements from the last mile channel 12. Therefore, the combined requests (including manifest file requests, chunk requests and data transfer requests) for bit rates from the media streamers can be planned so that the transmission of media chunks and other flows do not exceed the available bit rate. This eliminates the problem of bit rate waste. In addition, the combined requests can be planned to fill the last mile channel as much as possible. This eliminates the problem of unused bit rate.

The system may be implemented within the architecture of any broadband provider such as mobile providers, HFC networks, DSL networks and any other type of network. In all cases, the system 40 may be implemented upstream from the client at the place that has full visibility of the bit rate limiting last mile channel.

Additionally or alternatively, the system may be implemented in a hierarchical fashion. For example, the system may be implemented in a residential gateway (or DSLAM) to manage different clients within the house and also in the Central Office to manage bit rates among different households.

It should be mentioned that the collaborative decisions can be achieved by one single process which manages all the client requests or by numerous processes, each one proxying one client, that negotiate among themselves.

Figure 3:
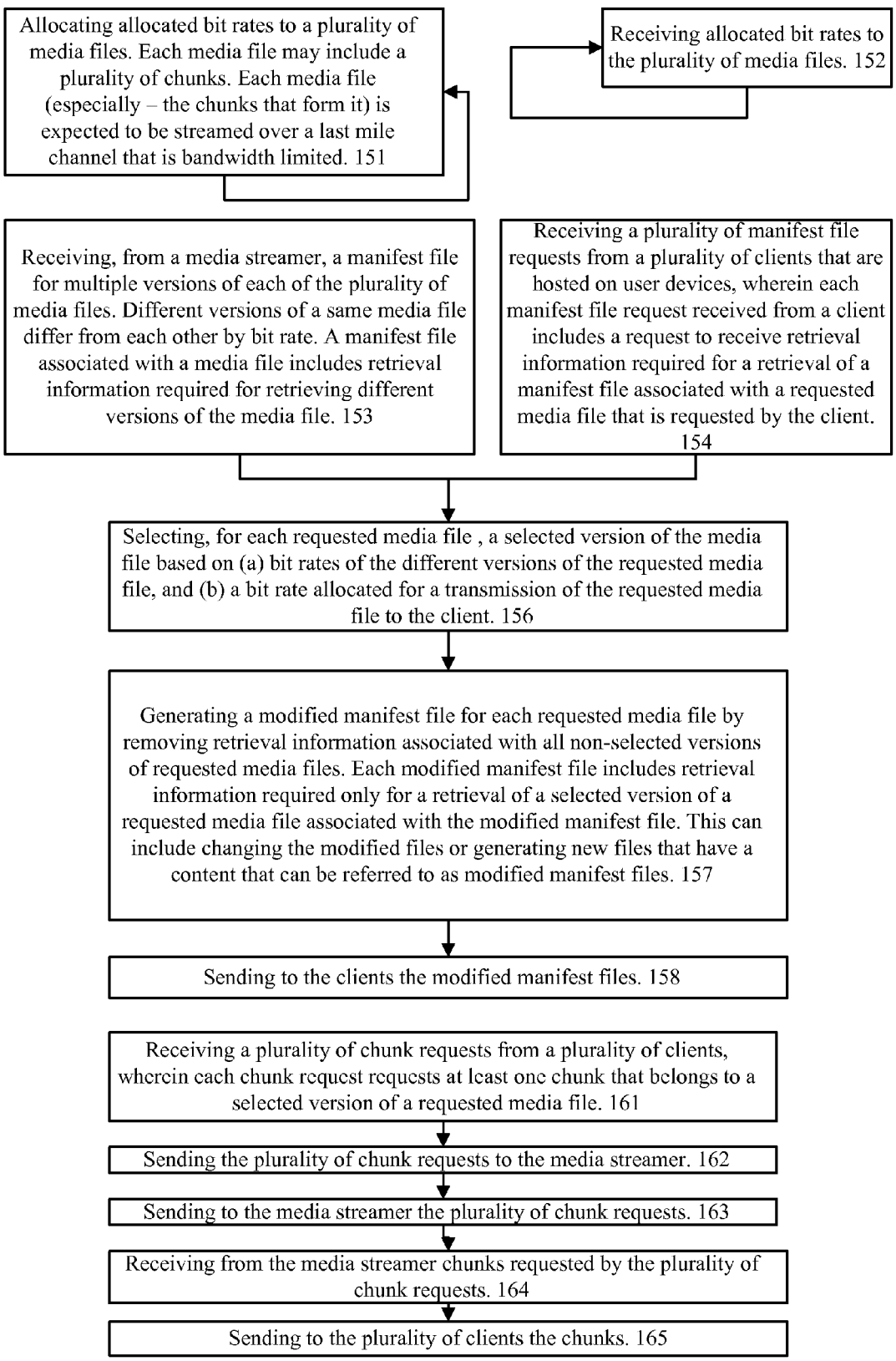
FIG. 3 illustrates a method according to an embodiment of the invention.

FIG. 3 illustrates method 150 according to an embodiment of the invention.

Method 150 may include a first sequence of bit rate allocation, a second sequence of manifest file management and modification and a third sequence of media chunk streaming.

The first sequence can start by either one of stage 151 and 152.

Stage 151 includes allocating allocated bit rates to a plurality of media files. Each media file may include a plurality of chunks. Each media file (especially—the chunks that form it) is expected to be streamed over a last mile channel that is bandwidth limited.

Stage 152 includes receiving allocated bit rates to the plurality of media files.

The bit rate allocation can change over time and the bit rate allocations can be updated or changed over time. This is reflected by the arrows that link box 151 to itself and link box 152 to itself.

The second sequence can start by stages 153 and 154.

Stage 153 includes receiving, from a media streamer, a manifest file for multiple versions of each of the plurality of media files. Different versions of a same media file differ from each other by bit rate. A manifest file associated with a media file includes retrieval information required for retrieving different versions of the media file.

Stage 154 includes receiving a plurality of manifest file requests from a plurality of clients that are hosted on user devices, wherein each manifest file request received from a client includes a request to receive retrieval information required for a retrieval of a manifest file associated with a requested media file that is requested by the client.

Stages 153 and 154 are followed by stage 156 of selecting, for each requested media file, a selected version of the media file based on (a) bit rates of the different versions of the requested media file, and (b) a bit rate allocated for a transmission of the requested media file to the client. The bit rate can be allocated during stage 152. Alternatively, the allocated bit rate can be received during stage 151.

Stage 156 is followed by stage 157 of generating a modified manifest file for each requested media file by removing retrieval information associated with all non-selected versions of requested media files. Each modified manifest file includes retrieval information required only for a retrieval of a selected version of a requested media file associated with the modified manifest file. This stage can include changing the modified files or generating new files that have a content that can be referred to as modified manifest files.

Stage 157 may be followed by stage 158 of sending to the clients the modified manifest files.

The third sequence starts by stage 161 of receiving a plurality of chunk requests from a plurality of clients, wherein each chunk request requests at least one chunk that belongs to a selected version of a requested media file.

Stage 161 is followed by stage 162 of sending the plurality of chunk requests to the media streamer.

Stage 162 is followed by stage 163 of sending to the media streamer the plurality of chunk requests.

Stage 163 is followed by stage 164 of receiving from the media streamer chunks requested by the plurality of chunk requests.

Stage 164 is followed by stage 165 of sending to the plurality of clients the chunks.

Stage 165 can be followed by stage 161.

It is noted that any updates in the allocation of bit rates can be reflected in the selection made during stage 156.

Figure 4:
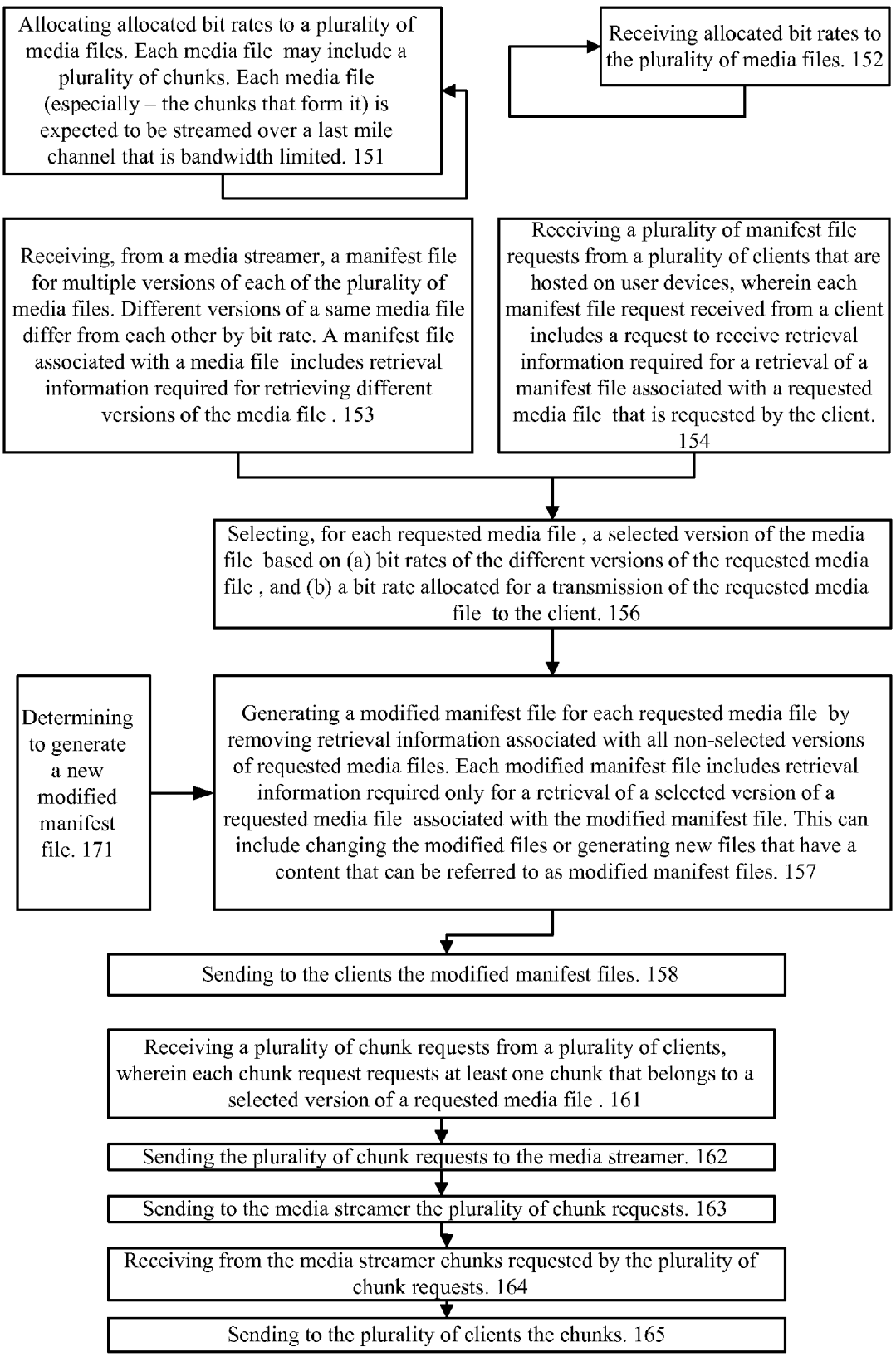
FIG. 4 illustrates a method according to an embodiment of the invention.

FIG. 4 illustrates method 170 according to another embodiment of the invention. Method 170 differs from method 150 by including stage 171.

Method 170 includes initiating a generation of modified manifest files even at an absence of media file requests. Stage 171 includes determining to generate a new modified manifest file. The new modified manifest file differs from a previously generated modified manifest file by the selection of versions of media files to be transmitted to the clients. The new modified manifest file and the previously generate manifest file can refer to the same parts of media files of to different parts.

Stage 171 is followed by stage 157.

Stage 171 can include determining to generate a new modified manifest file in response to events (that differ from a reception of manifest file requests), or in a predetermined period. It can include determining to generate a new modified manifest file after a predetermined time period lapses from a last reception of a manifest file request, in response to a change in an allocation of bit rates, after a streaming of a predefined portion of a media file to a client, and the like.

Figure 5:
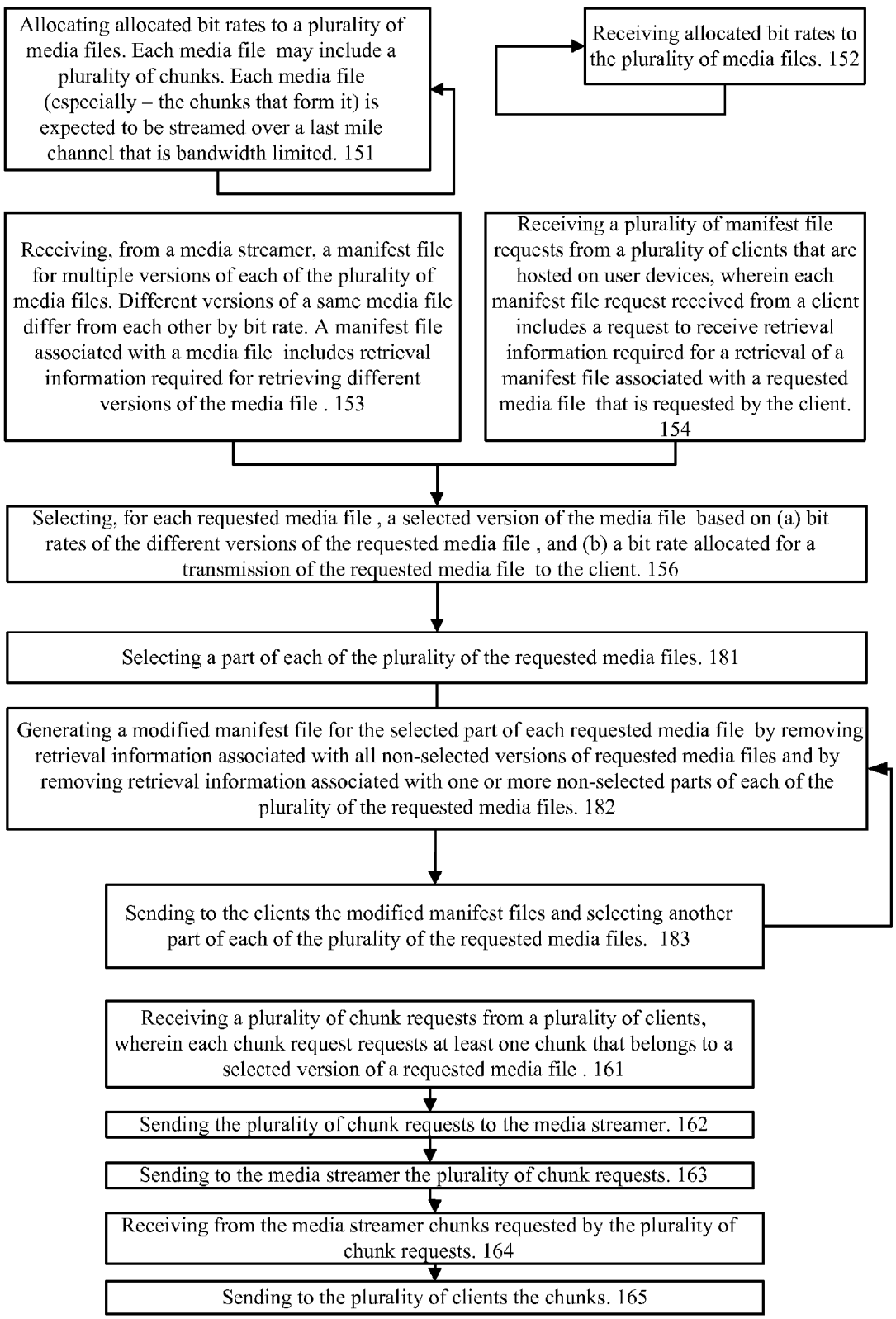
FIG. 5 illustrates a method according to an embodiment of the invention.

FIG. 5 illustrates method 180 according to an embodiment of the invention. Method 180 of FIG. 5 differs from method 150 of FIG. 3 by including stages 181-183 instead of stages 157-158. Method 180 can force clients to send multiple manifest file requests by sending to the clients modified manifest files that allow the retrieval of only one part per media file—thus providing time based segmentation of the media files. After the clients determine that other parts of the media files are requested they will generate new manifest file requests and the system executing method 180 will expose them parts of the media files of versions that have bit rates the reflect the current bit rate allocation, thus allowing method 180 to adjust to and take into account bit rate allocation changes that may occurred after the previous transmission of modified manifest files.

If stage 153 includes receiving, from a media streamer, a manifest file for multiple versions of each of the plurality of media files then stages 181-183 can be executed for different parts of the plurality of media files.

Stage 181 includes selecting a part of each of the plurality of the requested media files.

Stage 181 is followed by stage 182 of generating a modified manifest file for the selected part of each requested media file by removing retrieval information associated with all non-selected versions of requested media files and by removing retrieval information associated with one or more non-selected parts of each of the plurality of the requested media files.

Stage 182 is followed by stage 183 of sending to the clients the modified manifest files and selecting another part of each of the plurality of the requested media files. Stage 183 can be followed by stage 182—until the sequence of stages is completed for all the parts of each media file.

It is expected that the third sequence of stages will be repeated for each iteration of stages 181-183. Thus, stage 161 will include receiving a plurality of chunk requests from a plurality of clients, wherein each chunk request requests at least one chunk that belongs to a selected version of a selected part of a requested media file.

Figure 6:
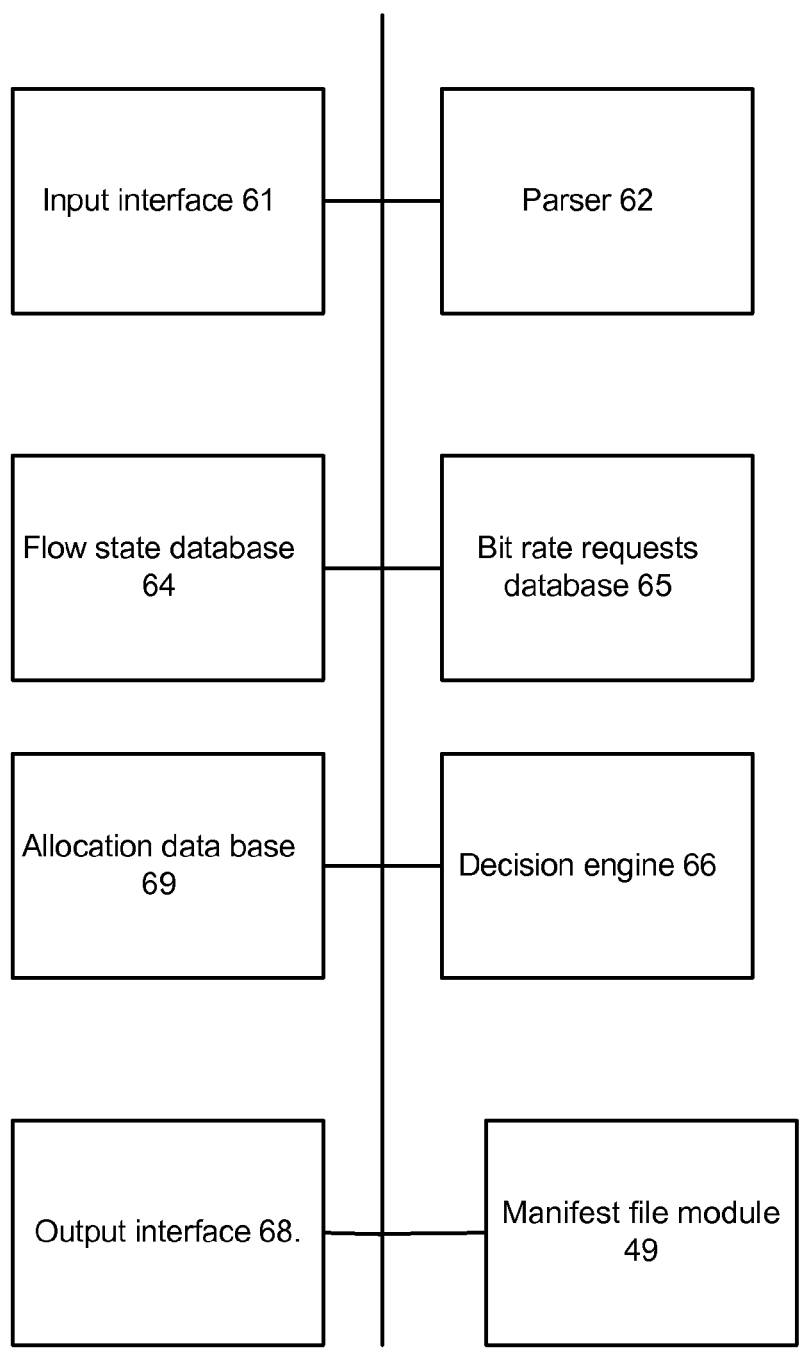
FIG. 6 illustrates a system according to an embodiment of the invention.

According to an embodiment of the invention a system 60 is provided. An embodiment of this system is illustrated in FIG. 6. The system 60 receives information packets such as media packets that belong to media chunks (media flows) and control packets. Some of the control packets include chunk requests.

For simplicity of explanation the following description will refer to media packets and to chunk requests.

The system 60 includes an input interface 61, a parser 62, a flow state database 64, a bit rate requests database 65, an allocation data base 69, a decision engine 66 and an output interface 68. The decision engine 66 can include the manifest file module 49.

The parser 62 parses incoming packets received by the input interface 60. Packets are classified as either control packets (such as chunk requests) or data packets (such as media packets). The decision engine and manifest file module may form a processing module.

Media packets or information representing media packets are used to update the flow state database 64. Control packets such as chunk requests or information representing the control packets are used to update the bit rate requests database 65. Both databases 64 and 65 provide a view of the bit rate utilization of the last mile channel and of requested bit rate for chunk requests—fulfilled chunk requests and those which were rejected or otherwise not fulfilled.

The allocation data base 69 stores the allocation of bit rates.

The decision engine 66 can access all databases and apply a bit rate control policy. It can, for example, allocate bit rates and then generate modified manifest files accordingly. It can also control the transmission of the modified manifest files to the clients. The decision engine 66 can be a processing module or be hosted by a processing module.

According to an embodiment of the invention the flow state database 64 is used to track all the flows in last mile channel, track the utilization, identify related flows, such as consecutive segments of an ABR stream, identify significant changes in the state of the media flows that warrant a notification of the decision engine. Consecutive segments of an ABR stream can be the subject of different chunk requests that are sent by the same client. The client can send one or more chunk requests related to one or more media chunks even before the client receives one or more previously requested media chunks, if these different chunk requests are both identified as being associated to the same media stream then the bit rate allocation can take this into account when comparing requested bit rates and allocated bit rates.

The decision engine 66 can be activated when pre-defined conditions are fulfilled such as more than a pre-defined change in the utilized bit rate, more than a pre-defined amount of newly requested bit rates, and the like. Alternatively, every chunk requests can be sent to the decision engine 66.

The decision engine 66 may allocate bit rates to flows and especially to media chunks.

According to an embodiment of the invention the decision engine 66 can distinguish between Available Bit Rate (ABR) flows and Progressive Download (PD) flows. It can allocate to each of these types of streaming media flows its own aggregate bit rate and apply the same bit rate control policy for both or apply different bit rate control policies for each.

In various streaming techniques the client is provided with media chunks even before it starts viewing these media chunks. This may prevent media viewing problems when the client is temporarily prevented from receiving the media or when the streaming to the client is otherwise limited due to various reasons. In case that the client decides not to view these media chunks, their transmission over the last mile channel results in a waste of bandwidth. In order to prevent this waste, the decision controller may delay the transmission of media packets from the media streamer. This can be done by delaying acknowledgement messages sent from the client (towards the media streamer) indicative of a reception of such packets. This policy can be applied, for example, on ABR chunks.

According to various embodiments of the invention the decision engine 66 can limit the amount of media chunks that are downloaded to a client so that if the client ends viewing a media stream before viewing all the media chunks that were downloaded to it—less media chunks will be wasted. The limitation can include delaying a transmission of acknowledgment messages to a media streamer, delaying a transmission of chunk requests and the like.

Figure 7:
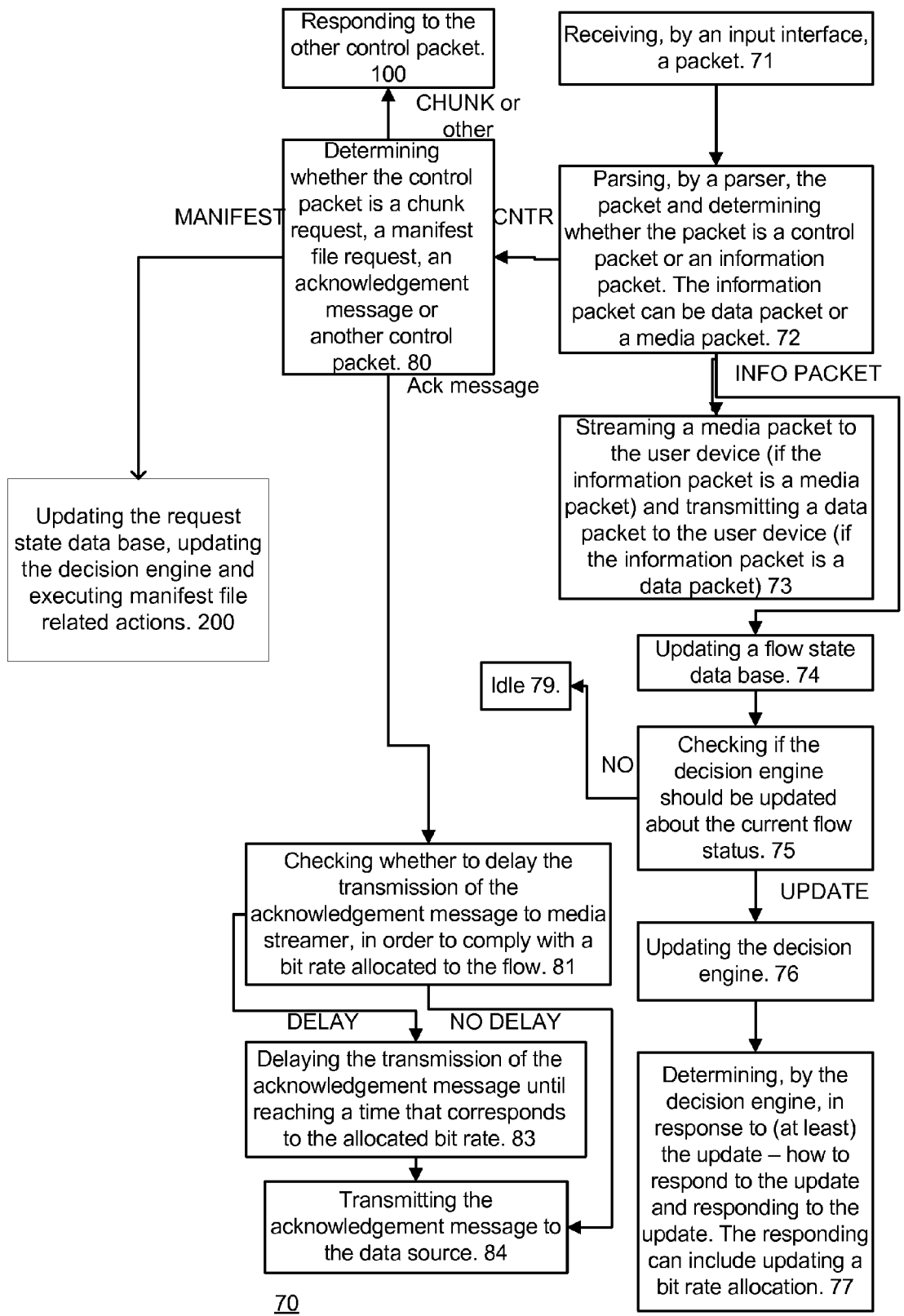
FIG. 7 illustrates a method according to an embodiment of the invention.

FIG. 7 illustrates method 70 for enforcing a bit rate allocation according to an embodiment of the invention.

Method 70 starts by stage 71 of receiving, by an input interface, a packet.

Stage 71 is followed by stage 72.

Stage 72 includes parsing, by a parser, the packet and determining whether the packet is a control packet or an information packet. The information packet can be data packet or a media packet.

If the packet is an information packet (INFO PACKET) then stage 72 is followed by stages 73 and 74.

If the packet is a control packet (CNTR) then stage 72 is followed by stage 80.

Stage 73 includes streaming a media packet to the user device (if the information packet is a media packet) and transmitting a data packet to the user device (if the information packet is a data packet). It is noted that according to some embodiments of the invention method 700 only addresses upstream traffic and does not participate in the downstream data path so that stage 73 may not be included in method 700.

Stage 74 includes updating a flow state data base. Thus the flow state data base may be updated to reflect the actual bit rate utilization.

Stage 74 may be followed by stage 75 of checking if the decision engine should be updated about the current flow status.

If the answer is positive (UPDATE) stage 74 is followed by stage 76, else (NO) stage 74 can jump to an idle stage 79.

The checking of stage 75 can include applying predefined conditions to this updating in order to provide a tradeoff between too many updates (that may consume too many computerized resources or communication resources) and fewer than desired updates (that may cause in sub-optimal allocation of bit rate). For example—the decision engine can be update per predefined period, per predefined amount of change in requested or utilized bit-rates, when a new user is added, when a new flow is added, when a user leaves or when a flow is terminated.

Stage 76 includes updating the decision engine.

Stage 76 is followed by stage 77 of determining, by the decision engine, in response to (at least) the update—how to respond to the update and responding to the update. The responding can include updating a bit rate allocation.

Stage 80 includes determining whether the control packet is a chunk request (CR), an acknowledgement message (Ack message) or another control packet (other).

If the control packet is an acknowledgement message then stage 80 is followed by stage 81.

If the control packet is a manifest file request stage 80 may be followed by stage 200 of updating the request state data base, updating the decision engine and executing manifest file related actions—such as those illustrated in the third sequence of each of methods 130, 140 or 150.

If the control packet is a chunk request or another control packet then stage 80 is followed by stage 100 of responding to the other control packet.

Stage 81 includes checking whether to delay the transmission of the acknowledgement message to media streamer, in order to comply with a bit rate allocated to the flow. Delay may be required if the allocated bit rate mandates a certain period (or a certain range of periods) between consecutive transmissions of acknowledgement messages.

If the answer is positive (DELAY) then stage 81 is followed by stage 83 of delaying the transmission of the acknowledgement message until reaching a time that corresponds to the allocated bit rate. The period between consecutive transmissions of acknowledgement messages may reflect the allocated bit rate. If, for example, each acknowledgment message is followed by a streaming of X bits and the allocation of bit rate is Y bits per second than the delay can be substantially equal to X/Y seconds. If the answer is negative (NO DELAY) than stage 81 is followed by stage 84.

Stage 83 is followed by stage 84 of transmitting the acknowledgement message to the data source.

Stage 81 and 83 can be executed by a protocol manipulator (such as a HTTP manipulator) that may access the decision engine or the allocation data base and determine the allocated bit rate for the flow that is related to the acknowledgement message.

A non-limiting example of a bit rate control policy is provided below:

A maximal allowable aggregate bit rate for transmitting video chunks (or all types) is defined—$T_{BR}$.

A maximal allowable bit rate for high priority users ($PU_{BR}$) may be defined.

A maximal allowable aggregate bit rate for transmission of BD media chunks and ABR media chunks are defined—$PD_{BR}$ and $ABR_{BR}$.

The maximal allowable aggregate bits rates for each type of media can be a fraction of $TABR_{max}$. For example $ABR_{BR}$ can equal 80% of $TABR_{max}$. ABR manifest files include a description all the possible bit rates for a stream. TABRmax is the sum of the possible maximums of the available streams.

After allocating bit rates for media chunks, the remaining bit rate for data transmission ($D_{BR}$) can be calculated by:

$$D_{BR} = (T_{BR} - PU_{BR} - PD_{BR} - ABR_{BR}) * \text{Factor}$$

The Factor is used to maintain some threshold below congestion.

Different bit rates can be allocated to different data flows although different data flows can be allocated the same bit rate. In the latter case—each data flow can be allocated with $F_{BR} = (D_{BR}/\text{number of data flows})$.

According to an embodiment of the invention the bit rate allocation parameters (bit rates, factor) can be re-calculated when at least one of the following events occurs:
  a. New flows
  b. Closing of flows
  c. Change of reception conditions
  d. Anticipation of events (hand-ins, hand-outs, etc.).

The following tables will illustrate an example of a bit rate control scheme.

Tables 1 and 2 illustrate an initial state of the system and bit rate allocations for different users.

TABLE 1

| Maximal allowable aggregate bit rate | $PD_{BR}$ | Number of PD flows | $ABR_{BR}$ | Number of ABR flows | Number of data flows |
|---|---|---|---|---|---|
| 4500 kbps | 800 kbps | 1 | 2100 kbps | 3 | 6 |

TABLE 2

| User | Flow ID | Flow type | Allocated bit rate (kbps) |
|---|---|---|---|
| User A | Flow 1 | Data | 250 |
| User B | Flow 2 | PD | 800 |
| User C | Flow 3 | ABR | 400 |
| User D | Flow 4 | ABR | 850 |
| User E | Flow 5 | ABR | 850 |
| User A | Flow 6 | Data | 250 |
| User F | Flow 7 | Data | 250 |
| User G | Flow 8 | Data | 250 |
| User H | Flow 9 | Data | 250 |
| User I | Flow 10 | Data | 250 |

In this initial stage each user is exposed only to the selected version of each media file—as indicated in the rate (kbps) column. Thus, for example, user A is exposed (received retrieval information related only to the 250 kbps (or less) version of flow 1.

At this initial state user F sends an acknowledgement message for a media packet of flow 7 he receives. The system may delay the transmission of the acknowledgement message in order to maintain the bit rate allocation—to 250 kbps.

After a while user B sends an acknowledgement message for a media packet of flow 2 he receives. The system may delay the transmission of the acknowledgement message in order to maintain the bit rate allocation—to 800 kbps.

After those events the decision engine decided to change the allocation of bit rates to users D and C—the bit rate allocation to flow 4 of user D is reduced from 850 kpbs to 400 kbps and to increase the bit rate allocation of flow 3 of user C from 400 to 850 kbps. The decision can be responsive to various reasons including but not limited to quality issues.

This change may include first reducing the bit rate allocation to user D and then increasing the bit rate allocation of user C. This order may prevent congestion. It is noted that if there is not risk of congestion (for example—when the order of the increment and decrement of bit rates will not cause congestions)—then the order can be reversed. It is noted that the change in bit rate allocation should be represented by a change in the retrieval information sent to the user—to allow the retrieval of only the selected version of the flows—the correspond to the (updated) allocated bit rate column. Thus, user D is exposed to the 400 kbps version of flow 4 instead to the 850 version of flow 4.

Table 3 illustrates this new state:

TABLE 3

| User | Flow ID | Flow type | Allocated bit rate (kbps) |
|---|---|---|---|
| User A | Flow 1 | Data | 250 |
| User B | Flow 2 | PD | 800 |
| User C | Flow 3 | ABR | 850 |
| User D | Flow 4 | ABR | 400 |
| User E | Flow 5 | ABR | 850 |
| User A | Flow 6 | Data | 250 |
| User F | Flow 7 | Data | 250 |
| User G | Flow 8 | Data | 250 |
| User H | Flow 9 | Data | 250 |
| User I | Flow 10 | Data | 250 |

After a while user D sends a chunk request and the system changes the bit rate associated with the video chunk to 400 bps—if the request (prior the change of bit rate allocation) requested more than 400 bps.

After a while user C sends a chunk request and the system changes the bit rate associated with the video chunk to 850 bps—if the request (prior the change of bit rate allocation) requested less than 850 bps (or more than 850 bps).

After a while a new user is added—user J and a new flow (flow 11) is also added. This will result in a change in both status tables, as illustrated by tables 4 and 5:

TABLE 4

| Maximal allowable aggregate bit rate | $PD_{BR}$ | Number of PD flows | $ABR_{BR}$ | Number of ABR flows | Number of data flows |
|---|---|---|---|---|---|
| 4500 kbps | 800 kbps | 1 | 2800 kbps | 4 | 6 |

TABLE 5

| User | Flow ID | Flow type | Allocated bit rate (kbps) |
|---|---|---|---|
| User A | Flow 1 | Data | 250 |
| User B | Flow 2 | PD | 800 |
| User C | Flow 3 | ABR | 850 |
| User D | Flow 4 | ABR | 400 |
| User E | Flow 5 | ABR | 850 |
| User A | Flow 6 | Data | 250 |
| User F | Flow 7 | Data | 250 |
| User G | Flow 8 | Data | 250 |
| User H | Flow 9 | Data | 250 |
| User I | Flow 10 | Data | 250 |
| User J | Flow 11 | ABR | 400 |

Although the ABR for User J is 850 kbps—only 700 kbps were added to ABRbr of table 4 according to TABRmax. Only 400 kpbs were allocated to flow 11 (in table 5) because in the example, the manifest stated that the next (after 400 kbps) bitrate level is 850 kbps and this may be too high.

After a while user J sends a chunk request for flow 11 and the system changes the bit rate associated with the video chunk to 400 bps—if the request (prior the change of bit rate allocation) requested more than 850 bps.

After a while user A sends an acknowledgement message for data flow 1 he receives. The system may delay the transmission of the acknowledgement message in order to maintain the bit rate allocation—to 150 kbps.

Once again—the changes in the bit rate allocation are reflected by changes in the modified manifest files.

Figure 8:
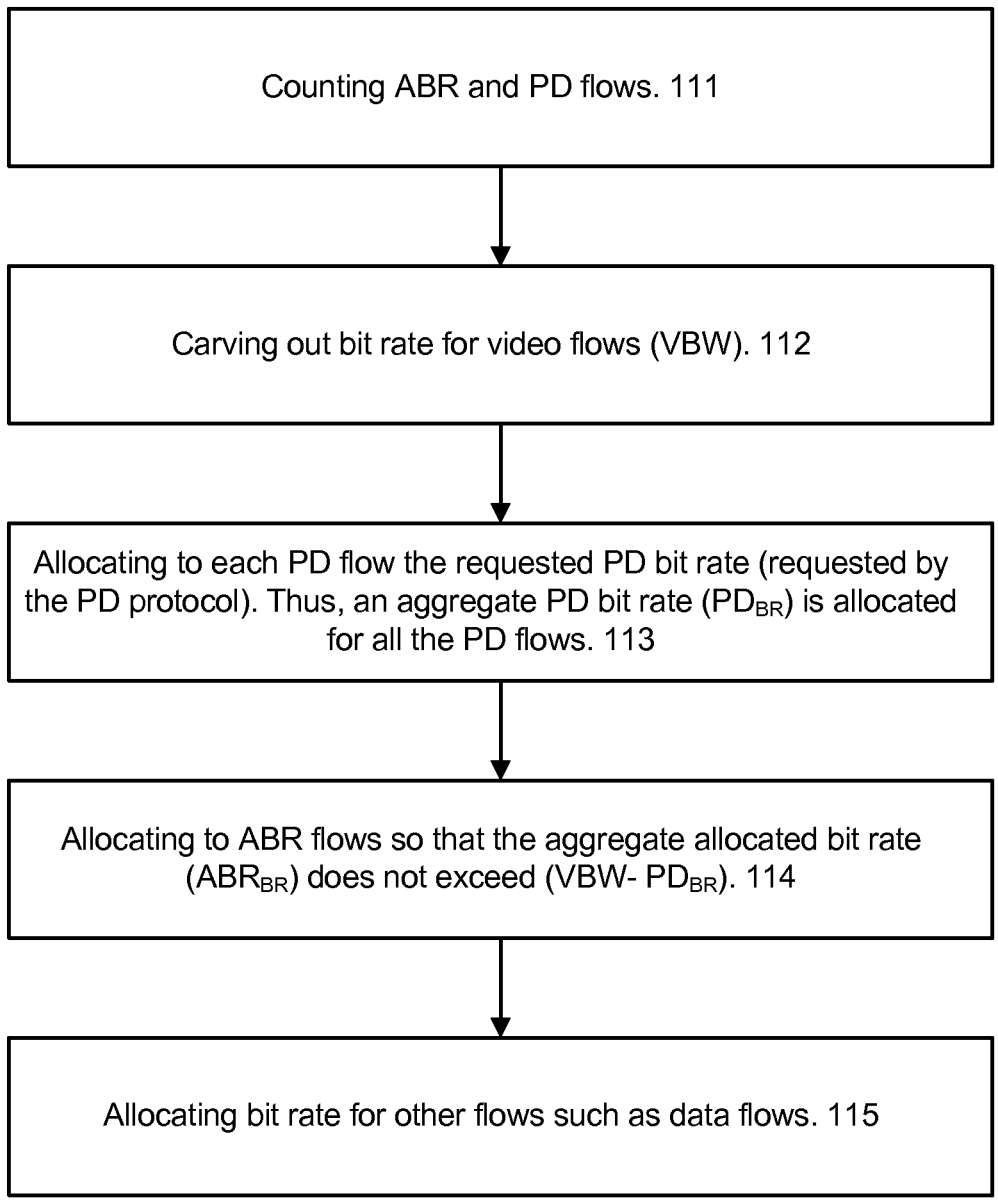
FIG. 8 illustrates a method according to an embodiment of the invention.

FIG. 8 illustrates method 110 for bit rate allocation according to an embodiment of the invention.

Method 110 includes a sequence of stages 111, 112, 113, 114 and 115.

Stage 111 includes counting ABR and PD flows.

Stage 112 includes carving out bit rate for video flows (VBW).

Stage 113 includes allocating to each PD flow the requested PD bit rate (requested by the PD protocol). Thus, an aggregate PD bit rate ($PD_{BR}$) is allocated for all the PD flows.

Stage 114 includes allocating to ABR flows so that the aggregate allocated bit rate ($ABR_{BR}$) does not exceed (VBW-$PD_{BR}$). The allocation between different ABR flows can be responsive to quality considerations—lower quality flows can receive more bit rate.

Stage 115 includes allocating bit rates for other flows such as data flows.

According to an embodiment of the invention method 110 also includes an initialization stage 119 that include allocating bit rate for premium users. Stage 119 may precede stage 111.

Although the text above illustrated methods that include stages, and system that execute operations in relation to a plurality of media files it is noted that any of the disclosed methods or systems can be applied on a single media file.

According to an embodiment of the invention the control packets do not include chunk requests or acknowledgement messages but rather include commands that relate to other network functions and the chunk requests and acknowledgement messages can be categorized to information packets. In this case the mentioned above methods and system should classify information packets to a plurality of classes—including acknowledgement messages and chunk requests and process these requests as mentioned above. A non-limiting example of a network that perform a different classification includes a wireless network in which control signals can include requests to perform a handoff between cells, and the like.

Any of the methods mentioned above can be executed by a computer that executed instructions stored in a non-transitory computer readable medium of a computer program product. The computer readable medium can be a diskette, a tape, a disk, a memory chip, a compact disk and the like. It can be read by using electro-magnetic manners, electrical signals, light beams, magnetic fields and the like.

Any combination of any methods (or any stages or any method) can be provided. One or more non-transitory computer readable mediums can store instructions for any combination of any stage or any method (or of any method).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

I claim:

1. A method for controlling at least one media file, the method comprising:
   allocating, by a system, allocated bit rates to a media file that comprises a plurality of chunks and is expected to be streamed over a last mile channel that is bandwidth limited;
   receiving, by the system and from a media streamer, a manifest file for multiple versions of the media file; wherein different version of the media file differ from each other by bit rate; wherein a manifest file associated the media file comprises retrieval information required for retrieving different versions of the media file;
   receiving by the system a manifest file request from a client that is hosted on a user device, wherein the manifest file request is received from a client and comprises a request to receive retrieval information required for a retrieval of a manifest file associated with a requested media file that is requested by the client;
   wherein the last mile channel is downstream to the media streamer;
   wherein the last mile channel is located downstream to the system;
   wherein the system differs from the user device and the media streamer;
   wherein the user device differs from the media streamer;
   wherein the user device is downstream to the last mile channel;
   selecting by the system a selected version of the media file based on (a) bit rates of the different versions of the requested media file, and (b) a bit rate allocated for a transmission of the requested media file to the client;
   generating by the system a modified manifest file for the requested media file by removing retrieval information associated with all non-selected versions of the requested media file; wherein the modified manifest file comprises retrieval information required only for a retrieval of a selected version of the requested media file; and
   sending to the client the modified manifest file.

2. The method according to claim 1, comprising:
   allocating allocated bit rates to a plurality of media files, each media file comprises a plurality of chunks and is expected to be streamed over a last mile channel that is bandwidth limited;
   receiving, from a media streamer, a manifest file for multiple versions of each of the plurality of media files; wherein different version of a same media file differ from each other by bit rate; wherein a manifest file associated with a media file comprises retrieval information required for retrieving different versions of the media file;
   receiving a plurality of manifest file requests from a plurality of clients that are hosted on user devices, wherein each manifest file request received from a client comprises a request to receive retrieval information required for a retrieval of a manifest file associated with a requested media file that is requested by the client;
   selecting, for each requested media file, a selected version of the media file based on (a) bit rates of the different versions of the requested media file, and (b) a bit rate allocated for a transmission of the requested media file to the client;
   generating a modified manifest file for each requested media file by removing retrieval information associated with all non-selected versions of requested media files; wherein each modified manifest file comprises retrieval information required only for a retrieval of a selected version of a requested media file associated with the modified manifest file; and sending to the clients the modified manifest files.

3. The method according to claim 2 comprising selecting a selected version of the media file that has a bit rate that best matches the bit rate allocated to the transmission of the media file to the client.

4. The method according to claim 2, wherein the allocating of bit rates to the plurality of media files is responsive to bit rates of different versions of the plurality of media files.

5. The method according to claim 2, comprising:
receiving a plurality of chunk requests from a plurality of clients, wherein each chunk request requests at least one chunk that belongs to a selected version of a requested media file; and sending the plurality of chunk requests to the media streamer.

6. The method according to claim 5, comprising:
sending to the media streamer the plurality of chunk requests;

receiving from the media streamer chunks requested by the plurality of chunk requests; and sending to the plurality of clients the chunks.

7. The method according to claim 2, comprising generating a modified manifest file in response to a manifest file request from a client by removing any retrieval information associated with at least a second part of the requested media file thereby exposing to the client only to a first part of the requested media file.

8. The method according to claim 7, comprising generating a new modified manifest file in response to a new manifest file request from the client, the new manifest file request refers to requested media file, by removing any retrieval information associated with at least the first part of the requested media file and by adding retrieval information relating to another part of the requested media file.

9. The method according to claim 2, comprising generating at least one modified manifest file and sending the at least one modified manifest file to a client even at an absence of a manifest file request from the client to retrieve the at least one modified manifest file.

10. The method according to claim 2, wherein the media streamer is unaware of a state of the last mile channel.

11. The method according to claim 6, comprising receiving from the plurality of clients acknowledgements indicative of a successful reception of chunks by the plurality of clients; determining, for each acknowledgement, whether to delay a transmission of the acknowledgement; wherein the determining is responsive to an amount of chucks of the media file that were downloaded by a client but not viewed by the client; and delaying a transmission to the media streamer of each acknowledgment for which a determination was made to delay the transmission.

12. A system comprising a processing module, an input interface and an output interface;
wherein the processing module is arranged to allocate bit rates to a plurality of media files, each media file comprises a plurality of chunks and is expected to be streamed over a last mile channel that is bandwidth limited;

wherein the input interface is arranged to receive;
a manifest file for multiple versions of each of the plurality of media files; wherein different version of a same media file differ from each other by bit rate; wherein a manifest file associated with a media file comprises retrieval information required for retrieving different versions of the media file; and a plurality of manifest file requests from a plurality of clients that are hosted on user devices, wherein each manifest file request received from a client comprises a request to receive retrieval information required wherein the processing module is arranged to:
select, for each requested media file, a selected version of the media file based on (a) bit rates of the different versions of the requested media file, and (b) a bit rate allocated for a transmission of the requested media file to the client;

generate a modified manifest file for each requested media file by removing retrieval information associated with all non-selected versions of requested media files; wherein each modified manifest file comprises retrieval information required only for a retrieval of a selected version of a requested media file associated with the modified manifest file;

wherein the output interface is arranged to send to the clients the modified manifest files;

wherein the last mile channel is downstream to the system;

wherein the user devices differ from the system; and wherein the user devices are downstream to the last mile channel.

13. The system according to claim 12, wherein the processing module is arranged to allocate allocated bit rates to a plurality of media files, each media file comprises a plurality of chunks and is expected to be streamed over a last mile channel that is bandwidth limited;

wherein the input interface is arranged to receive (i) a manifest file for multiple versions of each of the plurality of media files; wherein different version of a same media file differ from each other by bit rate; wherein a manifest file associated with a media file comprises retrieval information required for retrieving different versions of the media file; and (ii) a plurality of manifest file requests from a plurality of clients that are hosted on user devices, wherein each manifest file request received from a client comprises a request to receive retrieval information required for a retrieval of a manifest file associated with a requested media file that is requested by the client;

wherein the processing module is further arranged to (i) select, for each requested media file, a selected version of the media file based on (a) bit rates of the different versions of the requested media file, and (b) a bit rate allocated for a transmission of the requested media file to the client; and (ii) generate a modified manifest file for each requested media file by removing retrieval information associated with all non-selected versions of requested media files; wherein each modified manifest file comprises retrieval information required only for a retrieval of a selected version of a requested media file associated with the modified manifest file; and wherein the output interface is arranged to send to the clients the modified manifest files.

14. The system according to claim 13, wherein the processing module is arranged to select a selected version of the media file that has a bit rate that best matches the bit rate allocated to the transmission of the media file to the client.

15. The system according to claim 13, wherein the processing module is arranged to allocate bit rates to the plurality of media files is responsive to bit rates of different versions of the plurality of media files.

16. The system according to claim 13, wherein the input interface is arranged to receive a plurality of chunk requests from a plurality of clients, wherein each chunk request requests at least one chunk that belongs to a selected version of a requested media file; and wherein the output interface is arranged to send the plurality of chunk requests to the media streamer.

17. The system according to claim 16, wherein the output interface is arranged to send to the media streamer the plurality of chunk requests; wherein the input interface is arranged to receive from the media streamer chunks requested by the plurality of chunk requests; and wherein the output interface is arranged to send to the plurality of clients the chunks.

18. The system according to claim 13, wherein the processing module is arranged to generate a modified manifest file in response to a manifest file request from a client by removing any retrieval information associated with at least a second part of the requested media file thereby exposing to the client only to a first part of the requested media file.

19. The system according to claim 18, wherein the processing module is arranged to generate a new modified manifest file in response to a new manifest file request from the client, the new manifest file request refers to requested media file, by removing any retrieval information associated with at least the first part of the requested media file and by adding retrieval information relating to another part of the requested media file.

20. The system according to claim 13, wherein the processing module is arranged to generate at least one modified manifest file and send the at least one modified manifest file to a client even at an absence of a manifest file request from the client to retrieve the at least one modified manifest file.

21. The system according to claim 13, wherein the media streamer is unaware of a state of the last mile channel.

22. The system according to claim 17, wherein the processing module is arranged to receive from the plurality of clients acknowledgements indicative of a successful reception of chunks by the plurality of clients; determine, in response to an amount of chucks of the media file that were downloaded by a client but not viewed by the client and for each acknowledgement, whether to delay a transmission of the acknowledgement; and delay a transmission to the media streamer of each acknowledgment for which a determination was made to delay the transmission.

23. A computer program product that comprises a non-transitory computer readable medium that stores instructions that once executed by a system cause the system to perform the stages of:
    allocating allocated bit rates to a plurality of media files, each media file comprises a plurality of chunks and is expected to be streamed over a last mile channel that is bandwidth limited;
    receiving, from a media streamer, a manifest file for multiple versions of each of the plurality of media files; wherein different version of a same media file differ from each other by bit rate; wherein a manifest file associated with a media file comprises retrieval information required for retrieving different versions of the media file;
    receiving a plurality of manifest file requests from a plurality of clients that are hosted on user devices, wherein each manifest file request received from a client comprises a request to receive retrieval information required for a retrieval of a manifest file associated with a requested media file that is requested by the client;
    selecting, for each requested media file, a selected version of the media file based on (a) bit rates of the different versions of the requested media file, and (b) a bit rate allocated for a transmission of the requested media file to the client;
    generating a modified manifest file for each requested media file by removing retrieval information associated with all non-selected versions of requested media files; wherein each modified manifest file comprises retrieval information required only for a retrieval of a selected version of a requested media file associated with the modified manifest file;
    sending to the clients the modified manifest files;
    wherein the last mile channel is downstream to the media streamer;
    wherein the user device differs from the media streamer;
    wherein the last mile channel is located downstream to the system;
    wherein the system differs from the user device and the media streamer; and
    wherein the user device is downstream to the last mile channel.

24. The computer program product according to claim 23, wherein the non-transitory computer readable medium stores instructions for:
    allocating allocated bit rates to a plurality of media files, each media file comprises a plurality of chunks and is expected to be streamed over a last mile channel that is bandwidth limited;
    receiving, from a media streamer, a manifest file for multiple versions of each of the plurality of media files; wherein different version of a same media file differ from each other by bit rate; wherein a manifest file associated with a media file comprises retrieval information required for retrieving different versions of the media file;
    receiving a plurality of manifest file requests from a plurality of clients that are hosted on user devices, wherein each manifest file request received from a client comprises a request to receive retrieval information required for a retrieval of a manifest file associated with a requested media file that is requested by the client;
    selecting, for each requested media file, a selected version of the media file based on (a) bit rates of the different versions of the requested media file, and (b) a bit rate allocated for a transmission of the requested media file to the client;
    generating a modified manifest file for each requested media file by removing retrieval information associated with all non-selected versions of requested media files; wherein each modified manifest file comprises retrieval information required only for a retrieval of a selected version of a requested media file associated with the modified manifest file; and
    sending to the clients the modified manifest files.

25. The computer program product according to claim 24, wherein the non-transitory computer readable medium stores instructions for selecting a selected version of the media file that has a bit rate that best matches the bit rate allocated to the transmission of the media file to the client.

26. The computer program product according to claim 24, wherein the non-transitory computer readable medium stores instructions for allocating of bit rates to the plurality of media files in response to bit rates of different versions of the plurality of media files.

27. The computer program product according to claim 24, wherein the non-transitory computer readable medium stores instructions for receiving a plurality of chunk requests from a plurality of clients, wherein each chunk request requests at least one chunk that belongs to a selected version of a requested media file; and sending the plurality of chunk requests to the media streamer.

28. The computer program product according to claim 27, wherein the non-transitory computer readable medium stores instructions for:

sending to the media streamer the plurality of chunk requests;

receiving from the media streamer chunks requested by the plurality of chunk requests; and sending to the plurality of clients the chunks.

29. The computer program product according to claim 24 wherein the non-transitory computer readable medium stores instructions for generating a modified manifest file in response to a manifest file request from a client by removing any retrieval information associated with at least a second part of the requested media file thereby exposing to the client only to a first part of the requested media file.

30. The computer program product according to claim 29 wherein the non-transitory computer readable medium stores instructions for generating a new modified manifest file in response to a manifest file request from a client by removing any retrieval information associated with at least a second part of the requested media file thereby exposing to the client only to a first part of the requested media file.

31. The computer program product according to claim 24 wherein the non-transitory computer readable medium stores instructions for generating at least one modified manifest file and sending the at least one modified manifest file to a client even at an absence of a manifest file request from the client to retrieve the at least one modified manifest file.

32. The computer program product according to claim 28 wherein the non-transitory computer readable medium stores instructions for receiving from the plurality of clients acknowledgements indicative of a successful reception of chunks by the plurality of clients; determining, for each acknowledgement, whether to delay a transmission of the acknowledgement; and delaying a transmission to the media streamer of each acknowledgment for which a determination was made to delay the transmission allocating the allocated bit rate to each of the media files by a system that is coupled to last mile channel.

* * * * *